US010977668B2

(12) United States Patent
Anjo et al.

(10) Patent No.: US 10,977,668 B2
(45) Date of Patent: Apr. 13, 2021

(54) MANAGEMENT ASSISTANCE DEVICE, MANAGEMENT ASSISTANCE METHOD AND COMPUTER-READABLE RECORDING MEDIUM

(71) Applicant: CASIO COMPUTER CO., LTD., Tokyo (JP)

(72) Inventors: Keita Anjo, Tokyo (JP); Koji Nishitani, Ome (JP); Noriyoshi Katsumura, Tokorozawa (JP); Taro Ejiri, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1088 days.

(21) Appl. No.: 15/439,689

(22) Filed: Feb. 22, 2017

(65) Prior Publication Data
US 2018/0005252 A1 Jan. 4, 2018

(30) Foreign Application Priority Data

Jun. 29, 2016 (JP) .............................. JP2016-128249

(51) Int. Cl.
*G06Q 30/02* (2012.01)
*G06T 11/20* (2006.01)
(Continued)

(52) U.S. Cl.
CPC ....... *G06Q 30/0201* (2013.01); *G06F 40/169* (2020.01); *G06F 40/174* (2020.01);
(Continued)

(58) Field of Classification Search
CPC .. G06F 40/174; G06F 40/169; G06F 3/04842; G06T 2200/24; G06Q 30/0201
(Continued)

(56) References Cited

U.S. PATENT DOCUMENTS 8,217,945 B1 * 7/2012 Moscovici ............. G06Q 50/01
345/440
9,244,894 B1 * 1/2016 Dale .................... G06F 3/04842
(Continued)

FOREIGN PATENT DOCUMENTS

CN 104090808 A 10/2014
CN 104346341 A 2/2015
(Continued)

OTHER PUBLICATIONS

Japanese Office Action (and English language translation thereof) dated Apr. 2, 2019 issued in counterpart Japanese Application No. 2016-128249.
(Continued)

*Primary Examiner* — Eric W Stamber
*Assistant Examiner* — George H Walker, III
(74) *Attorney, Agent, or Firm* — Holtz, Holtz & Volek PC

(57) ABSTRACT

A management assistance device includes a storage and a display controller. The storage stores management data of each of predetermined periods and comment information to be input by a user corresponding to a date. The display controller displays on a screen a chronological change of the management data as a graph. The display controller displays a predetermined mark at a position on the graph, the position corresponding to the date when the comment information is input, and, when the mark is selected by a user, displays on a screen the comment information corresponding to the date.

15 Claims, 9 Drawing Sheets

(51) Int. Cl.
  *G06F 3/0484* (2013.01)
  *G06F 40/169* (2020.01)
  *G06F 40/174* (2020.01)
(52) U.S. Cl.
  CPC ........ *G06T 11/206* (2013.01); *G06F 3/04842* (2013.01); *G06T 2200/24* (2013.01)
(58) Field of Classification Search
  USPC ....................................................... 705/7.29
  See application file for complete search history.

(56) References Cited

U.S. PATENT DOCUMENTS

| | | | |
|---|---|---|---|
| 10,078,864 B2* | 9/2018 | Liu | G06Q 30/0641 |
| 2001/0032107 A1 | 10/2001 | Iwata et al. | |
| 2004/0260717 A1* | 12/2004 | Albornoz | G06F 16/907 |
| 2013/0254016 A1 | 9/2013 | Yuyama et al. | |
| 2015/0220580 A1* | 8/2015 | Pitsos | G06F 16/35 |
| | | | 707/690 |
| 2015/0242384 A1* | 8/2015 | Reiter | G06F 3/04842 |
| | | | 715/202 |
| 2015/0332376 A1* | 11/2015 | Harada | G06F 16/51 |
| | | | 705/26.8 |
| 2016/0041973 A1* | 2/2016 | Beckley | G06F 3/04842 |
| | | | 707/608 |
| 2016/0098539 A1* | 4/2016 | Zamanakos | A61B 5/742 |
| | | | 705/3 |
| 2017/0052656 A1* | 2/2017 | Ohsumi | G06Q 10/0631 |
| 2019/0026589 A1* | 1/2019 | Sugihara | G06F 3/04842 |

FOREIGN PATENT DOCUMENTS

| | | |
|---|---|---|
| JP | 06309326 A | 11/1994 |
| JP | 2001312573 A | 11/2001 |
| JP | 2005237553 A | 9/2005 |
| JP | 2010271915 A | 12/2010 |
| JP | 3165543 U | 1/2011 |
| JP | 2011065340 A | 3/2011 |
| JP | 2013196483 A | 9/2013 |
| JP | 5949885 B2 | 7/2016 |

OTHER PUBLICATIONS

Japanese Office Action (and English language translation thereof) dated Oct. 30, 2018 issued in counterpart Japanese Application No. 2016-128249.

Chinese Office Action (and English translation thereof) dated Feb. 6, 2020, issued in counterpart Chinese Application No. 201710202332.1.

* cited by examiner

FIG.3

| DATE | SALES | NUMBER OF CUSTOMERS | AVERAGE SALES PER CUSTOMER | PURCHASE | COST RATE | GROSS PROFIT | GROSS PROFIT MARGIN RATIO | COST | EMPLOYMENT COST | FL RATIO | IMPORTANCE | COMMENTS |
|---|---|---|---|---|---|---|---|---|---|---|---|---|
| ... | ... | ... | ... | ... | ... | ... | ... | ... | ... | ... | ... | ... |
| 2016/6/26 | ¥301,655 | 86 | ¥3,508 | ¥112,500 | 37% | ¥189,155 | 63% | ¥10,000 | ¥114,560 | 75% | 2 | Turnover was high. Proposed recommended products. Made progress in food preparation. |
| 2016/6/27 | ¥224,527 | 64 | ¥3,508 | ¥78,100 | 35% | ¥146,427 | 65% | ¥10,000 | ¥76,500 | 69% | 3 | A person was struck by a train at the nearest station. A new staff member began his work and his education spent time. The operation to increase sales was not possible. |
| 2016/6/28 | ... | ... | ... | ... | ... | ... | ... | ... | ... | ... | ... | ... |
| ... | ... | ... | ... | ... | ... | ... | ... | ... | ... | ... | ... | ... |

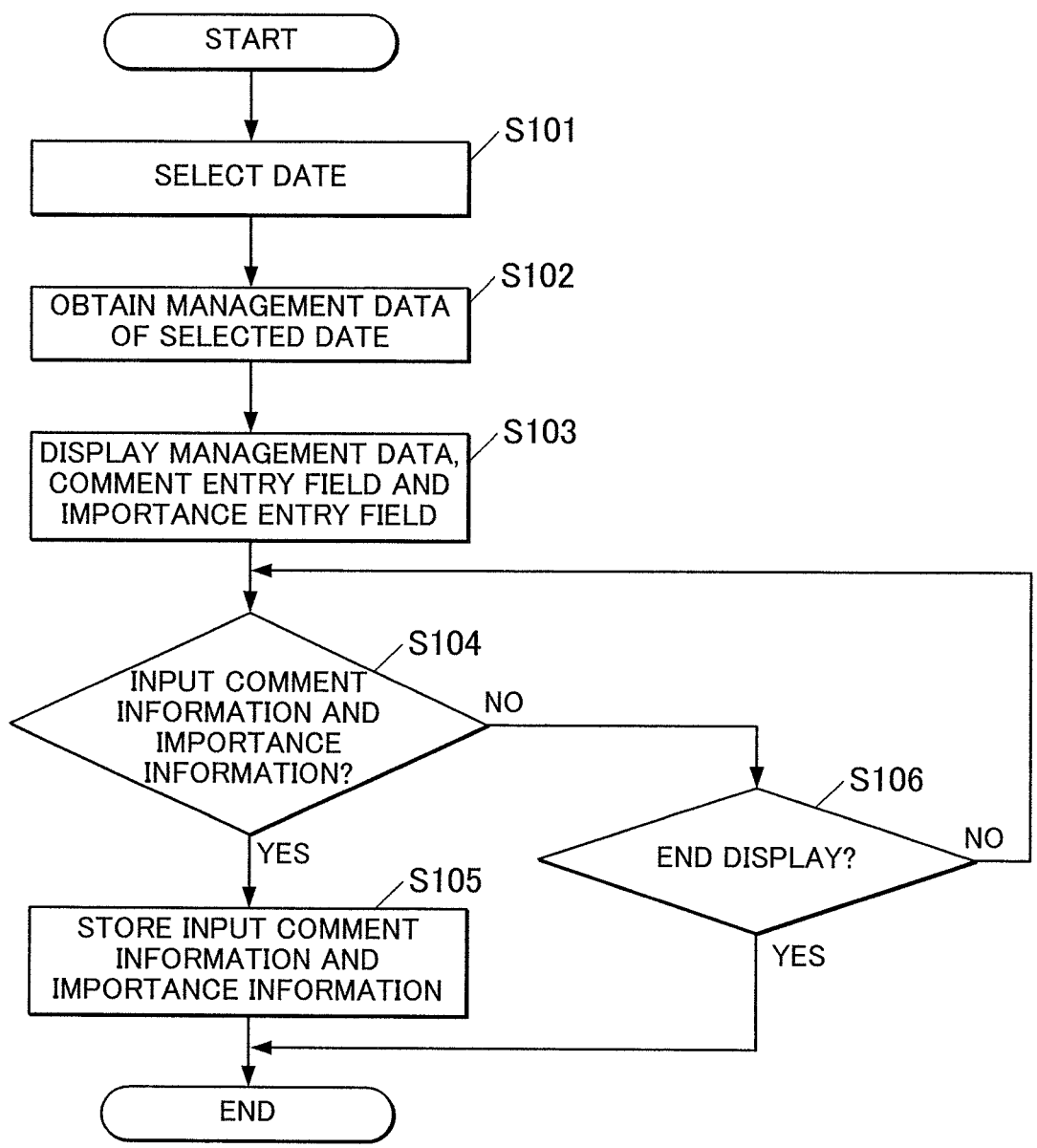

FIG.5

| | ToDo | DAILY PROCESSING | INDEX ANALYSIS | | 5 |

DAILY PROCESSING

2016/6/27

▽ACCOUNTING

| DATE | SALES | NUMBER OF CUSTOMERS | AVERAGE SALES PER CUSTOMER | PURCHASE | COST | EMPLOYMENT COST | FL RATIO |
|---|---|---|---|---|---|---|---|
| TODAY | ¥224,527 | 64 | ¥3,508 | ¥78,100 | ¥10,000 | ¥76,500 | 69% |
| YESTERDAY | ¥301,655 | 86 | ¥3,508 | ¥112,500 | ¥10,000 | ¥114,560 | 75% |

51a: ACCOUNT LINKAGE  51b: UNPROCESSED RECEIPT  51c: UNPROCESSED ToDo

— 51

▽SALARY

| NAME | ATTENDANCE | LEAVING | BREAK | MEAL | LABOR HOURS | EMPLOYMENT COST | SALARY ROUGH ESTIMATE |
|---|---|---|---|---|---|---|---|
| Taro YAMADA | 11:30 | 23:00 | 2.50H | | 9.00H | 12,025 | 130,164 |
| Ichiro SUZUKI | 10:00 | 22:07 | 2.00H | ○ | 10.00H | 15,625 | 141,086 |
| Jiro SATO | 9:46 | 20:41 | 1.50H | ○ | 9.25H | 12,025 | 133,250 |
| Saburo NAKATA | 10:48 | 23:45 | 2.00H | ○ | 10.75H | 13,425 | 78,150 |
| Shiro MURAKI | 11:02 | 23:48 | 2.00H | ○ | 10.50H | 13,200 | 66,300 |
| Goro GOTO | 12:00 | 22:00 | 1.50H | | 8.50H | 10,200 | 60,150 |
| | | SUM | 11.50H | 4 | 58.00H | 76,500 | 609,100 |

— 52

▽GENERAL COMMENTS

IMPORTANCE ★★☆ (53b)   ☂ □ (53c)   ADD IMAGE AND POP 📎 (53d)

ENTER MEMO, COMMENT, ETC. WHICH WILL BE SHOWN ON A GRAPH AS EVENTS.

53a

— 53

FIG.6
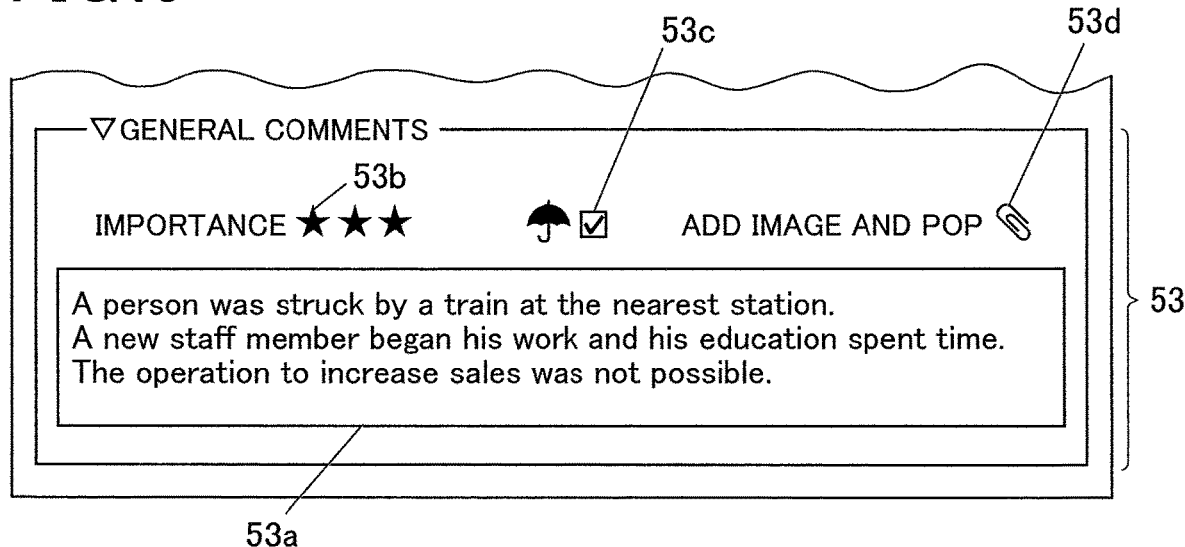
FIG.7
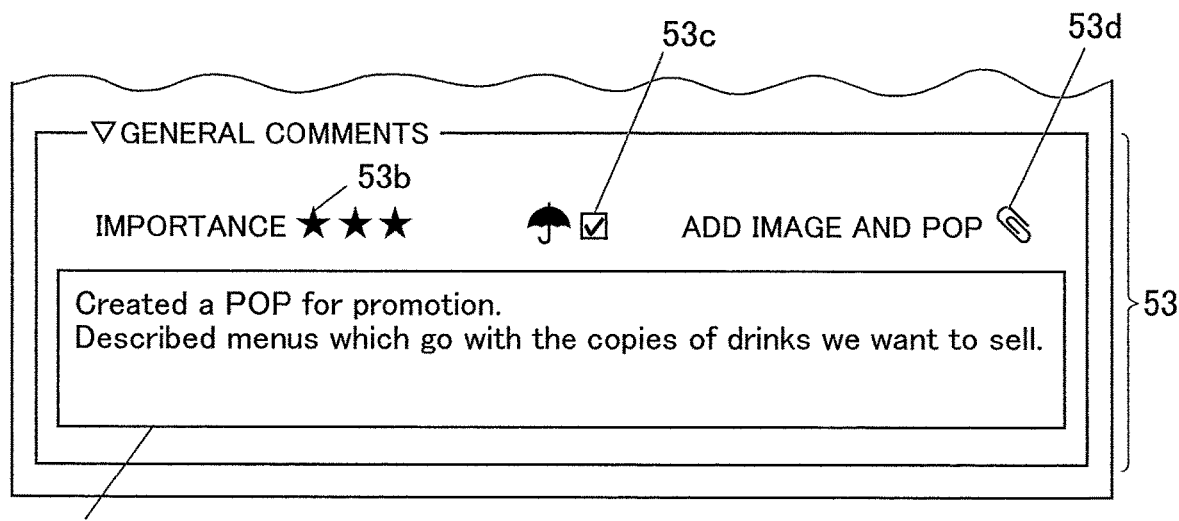

MANAGEMENT ASSISTANCE DEVICE, MANAGEMENT ASSISTANCE METHOD AND COMPUTER-READABLE RECORDING MEDIUM

CROSS-REFERENCE TO RELATED APPLICATIONS

This application is based upon and claims the benefit of priority from the prior Japanese Patent Application No. 2016-128249, filed on Jun. 29, 2016 and the entire contents of which are incorporated herein by reference.

BACKGROUND OF THE INVENTION

1. Field of the Invention

The present invention relates to a management assistance device, a management assistance method and a computer-readable recording medium.

2. Description of the Related Art

Conventionally, in many cases, the sole proprietors and corporation owners of restaurant business and retail business operate business based on visualized management data by using sales management device which summarizes and analyzes sales of shops on a daily basis or on a monthly basis and/or a business application program or the like such as a sales management program.

As such a sales management device, for example, a technique is proposed in which, based on the management data on a designated object date and a comparative date, index values showing the change of sales, number of customers and average sales per customer of the object date from those of a comparative date is calculated and the index values are shown (refer to JP 2011-065340 A)

SUMMARY OF THE INVENTION

However, in the prior art described above, information which is not expressed as a number of management data such as events outside shops and something a user noticed is not managed. Thus, even when a user can easily understand the change of management data based on the index values, considering the cause of the change or the measures for improvement is difficult.

An object of the present invention is to provide a management assistance device, a management assistance method and a recording medium which make it easier to consider the cause of the change of management data and to consider the measures for improvement.

A management assistance device of the present invention includes: a storage which stores management data of each of predetermined periods and comment information to be input by a user corresponding to a date; and a display controller which displays on a screen a chronological change of the management data as a graph, wherein the display controller displays a predetermined mark at a position on the graph, the position corresponding to the date when the comment information is input, and, when the mark is selected by a user, displays on a screen the comment information corresponding to the date.

A management assistance method of the present invention includes: a storing step which stores management data of each of predetermined periods and comment information to be input by a user corresponding to a date; and a display controlling step which displays on a screen a chronological change of the management data as a graph, wherein the display controlling step displays a predetermined mark at a position on the graph, the position corresponding to the date when the comment information is input, and, when the mark is selected by a user, displays on a screen the comment information corresponding to the date.

A non-transitory computer-readable recording medium of the present invention storing a program thereon, wherein the program makes a computer of a management assistance device perform processes, the processes including: a storing process which stores management data of each of predetermined periods and comment information to be input by a user corresponding to a date; and a display controlling process which displays on a screen a chronological change of the management data as a graph, wherein the display controlling process displays a predetermined mark at a position on the graph, the position corresponding to the date when the comment information is input, and, when the mark is selected by a user, displays on a screen the comment information corresponding to the date.

In accordance with the present invention, it is possible to provide a management assistance device, a management assistance method and a recording medium which make it easy to consider the cause of the change of the management data and the measures for improvement.

BRIEF DESCRIPTION OF THE DRAWINGS

The present invention is fully understood from the detailed description given hereafter and the accompanying drawings, which are given by way of illustration only and thus are not intended to limit the present invention, wherein:

FIG. 3 is a view showing a management data table stored in a storage;

FIG. 4 is a flowchart showing an example of comment input processing performed by the server;

FIG. 5 is a view showing an example of a comment input screen displayed in the comment input processing;

FIG. 6 is a view showing an example of the comment input screen after a variety of information is input;

FIG. 7 is a view showing another example of the comment input screen after a variety of information is input;

DETAILED DESCRIPTION OF THE PREFERRED EMBODIMENTS

Hereinafter, embodiments of the present invention will be described with reference to the drawings. Though various technical limitations which are preferable to carry out the present invention are added to the embodiment described below, the scope of the invention is not limited to the following embodiment and the illustrated examples.

[Configuration of Management Assistance System]

Figure 1:
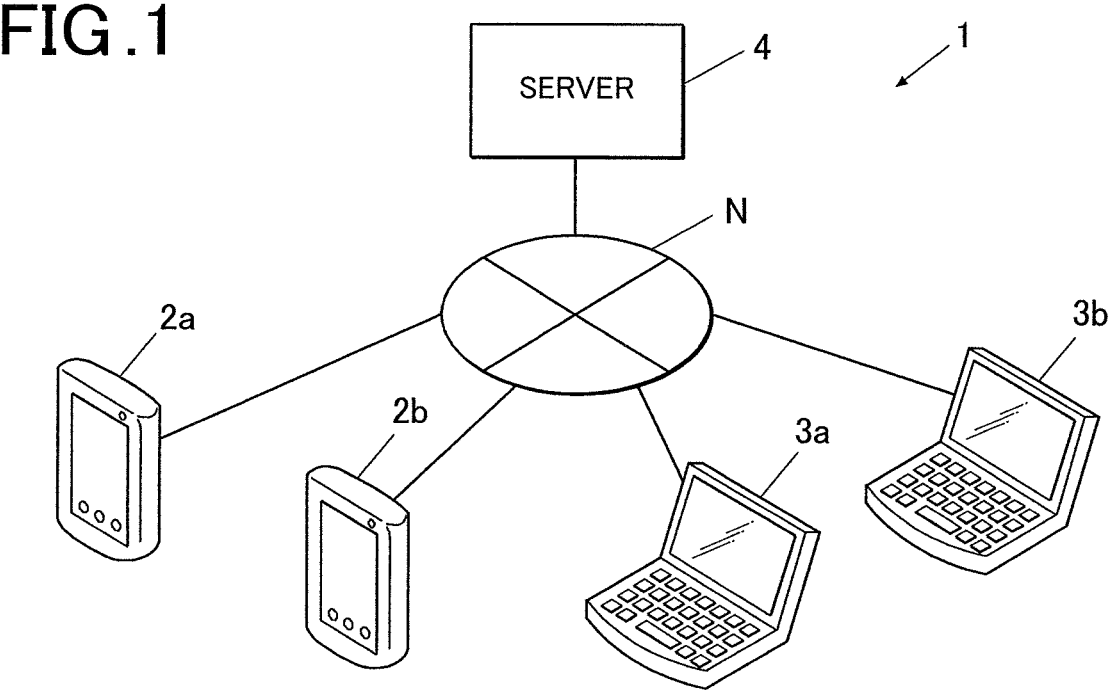
FIG. 1 is a schematic configurational view showing a management assistance system of the present embodiment.

The configuration of the present embodiment will be described with reference to FIG. 1. FIG. 1 shows a schematic configurational view of a management assistance system 1 of the present embodiment.

The management assistance system 1 of the present embodiment stores management data of a store or a company which a user is running and comment information regarding the daily management input by the user and enables the user to make easy consideration on the management based on the stored management data and comment information.

As shown in FIG. 1, the management assistance system 1 includes a server (management assistance device) 4, portable terminals 2a, 2b which are user terminals such as smartphones and tablets and personal computers (PC) 3a, 3b. These devices are connected and communicated with each other through a communication network N. Hereinafter, the portable tablets 2a, 2b and the PCs 3a, 3b are collectively referred to as user terminals.

The server 4 collects and summarizes the management data from the user terminals to store and manage the management data. The server 4 also stores and manages the comment information which is input from the user terminals corresponding to each date. The server 4 also distributes, in response to the requests from the user terminals, to the user terminals a comment input screen 5 for a user to input comments and display information of an index analysis screen 6 which displays the management data in association with the comment information.

The user terminals such as the portable terminals 2a, 2b and the PCs 3a, 3b send, for example, the accumulated management data and the input comment information to the server 4. These user terminals receive and display a variety of display information sent from the server 4 and accept user's input operation and send the operation information to the server 4. The PC 3a, 3b may be special-purpose terminals such as electronic registers and POS terminals.

The communication network N is configured by the internet However, the communication network N may include, for example, a Local Area Network (LAN), a Wide Area Network (WAN). The communication network may also include, for example, a phone line, an exclusive line, a mobile communication network, communication satellite network and CATV (Cable Television) line.

The management assistance system 1 is configured such that other application programs to be used on a variety of user terminals can be executed on the management assistance system 1. Such other application programs include those which perform, for example, a sales management operation to carry out sales calculation and analysis of a store for each day and each month, an accounting management operation to carryout payment of tax such as a fixed asset tax and an individual enterprise tax, a salary management operation to carry out processing of salary calculation of employees, an employment management operation to carry out shift management of employees in a store and attendance management of employees, a document management operation to create and manage information documents to interested operators and employees and POP (Point of purchase advertising) creating operation to create POPs which are advertising media for promotion to be used, for example, at stores.

[Configuration of Server 4]

Figure 2:
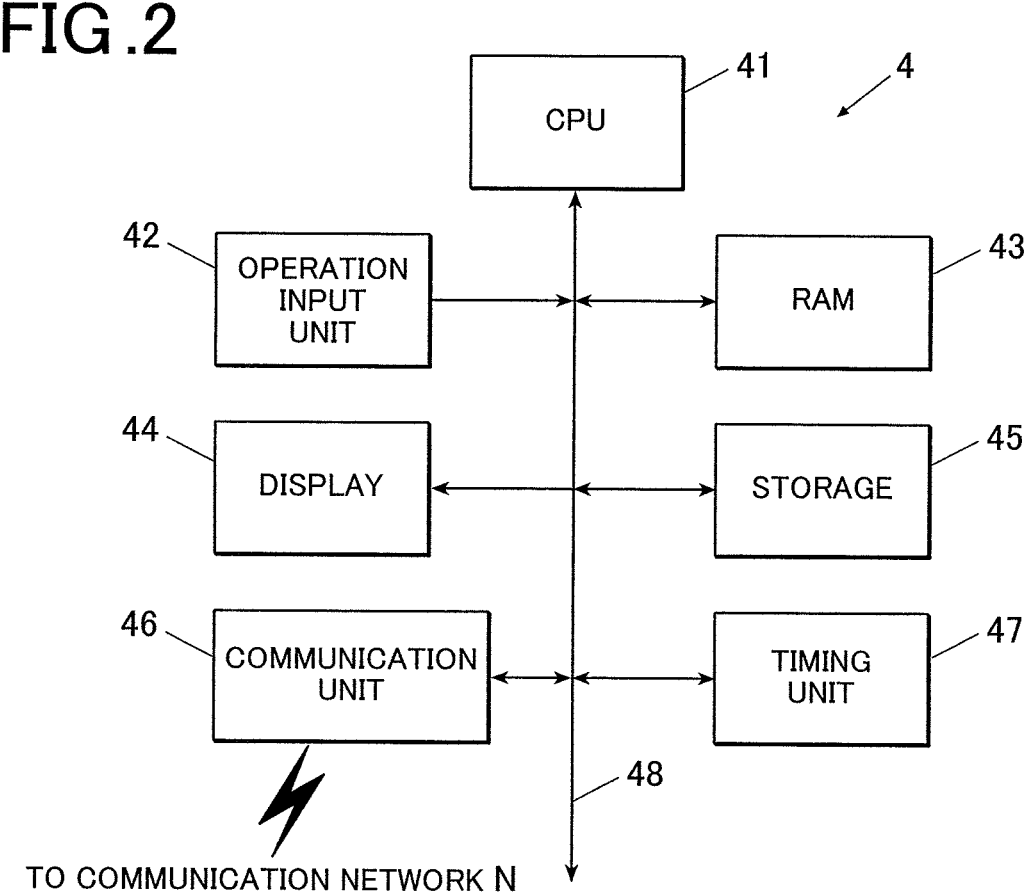
FIG. 2 is a block diagram showing a functional configuration of a server.

The internal configuration of the server 4 will be described. FIG. 2 shows the internal configuration of the server 4.

As shown in FIG. 2, the server 4 includes a CPU (Central Processing Unit) 41, an operation input unit 42, a RAM (Random Access Memory) 43, a display 44, a storage 45, a communication unit 46 and a timing unit 47. These components are connected with each other through a bus 48.

The CPU 41 reads a system program stored in the storage 45, deploys the system program in the work area in the RAM 43 and controls each component in accordance with the system program. Also, CPU 41 reads a processing program stored in the storage 45 and deploys the processing program in the work area to perform a variety of processing such as comment input processing and processing by the server 4 to perform index analysis display processing described below. The server 4 functions as a display controller and a condition setting unit.

The operation input unit 42 includes a keyboard equipped with cursor keys, character input keys, number input keys and various functional keys. The operation input unit 42 accepts inputs by a user who pushes each key and outputs the operation information to the CPU 41. The operation input unit 42 may also include a pointing device such as a mouse and accept the input of a position to output to the CPU 41 as the operation information.

The RAM 43 is a volatile memory. Also, the RAM 43 includes a work area where various programs to be executed and data regarding these various programs are stored, for example.

The display 44 is composed of an LCD (Liquid Crystal Display), a CRT (Cathode Ray Tube) or the like. The display 44 performs screen display in accordance with the display control signals from the CPU 41.

The storage 45 is composed of a HDD (Hard Disk Drive) including a magnetic recording medium, for example. The storage 45 stores the system program and processing programs to be executed by the CPU 41, an application program such as a Web server program and the data necessary to execute these programs. The processing programs include programs for various processing such as comment input processing and processing by the server 4 to perform index analysis display processing described below.

These programs are stored in the storage 45 in the form of computer-readable program codes. The CPU 41 sequentially executes processing in accordance with the program codes.

The storage 45 also stores various data sent from the user terminal.

For example, the storage 45 stores management data sent from a user terminal. As the management data, for example, date, sales, number of customers, average sales per customer, purchase, cost rate, gross profit, gross profit margin ratio, cost, employment cost, FL ratio and the like are stored. The employment cost includes detailed content such as the salary for employees.

Also, the storage 45 stores the comment information which is input to the user terminal and sent from the user terminal corresponding to a date and importance information which shows the importance of the comment information. The comment information is text information which is input by a user corresponding to a date. The comment information is preferably input after the business on the date. Such comment information includes, for example, the events the user noticed during daily management, the measures the user carried out to improve the management and the like. The importance information is information which shows the importance of the input comment information and has three ranks in accordance with a user's choice. The storage 45 stores the management data, the comment information and the importance information as a management data table as shown in FIG. 3, for example.

Furthermore, when image data or POP data is input to the user terminal and sent from the user terminal with the comment information, the storage 45 stores the image data or the POP data. The image data includes, for example, a picture of a shop taken by the portable terminals 2a, 2b, or the like and the image of a flier a user distributed. The POP data includes, for example, the POP data created by the management assistance system 1 which executes an application program to perform the POP creating operation.

The communication unit 46 is composed of a modem, a TA (Terminal Adaptor), a rooter, a network card, and the like. The communication unit 46 is connected with an external device such as the user terminal on the communication network N and sends and receives data.

The timing unit 47 includes a built-in timing unit circuit. The timing unit 47 measures current time and date to output as current time information.

[Operation of Server 4]

The server 4 configured as described above performs the comment input processing and the index analysis display processing.

First, the comment input processing will be described with reference to FIG. 4 to FIG. 7. FIG. 4 is a flowchart showing an example of the comment input processing. FIG. 5 shows a comment input screen 5 which is shown on the user terminal in the comment input processing. FIG. 6 shows an example of the comment input screen 5 after a variety of information is input. FIG. 7 shows another example of the comment input screen 5 after a variety of information is input.

As shown in FIG. 4, when the communication unit 46 receives from a user terminal an access request to the comment input screen 5, the CPU 41 of the server 4 selects a date based on the operation information from the user terminal (Step S101).

Next, the CPU 41 obtains the management data of the selected date from the storage 45 to display on the comment input screen 5 (Step S102). The CPU 41 also obtains the management data of the previous day of the selected date to display on the comment input screen 5 for a comparison.

Next, the CPU 41 displays on the user terminal the comment input screen 5 as shown in FIG. 5 wherein the comment input screen 5 includes the obtained management data and a comment entry field 53a for inputting comment information (Step S103).

The comment input screen 5 is constituted by an accounting information display area 51, a salary information display area 52, a general comment display area 53, and the like. The accounting information area 51 and the salary information display area 52 display the numerical values of the obtained management data, and the like. In the accounting information display area 51, in addition to the management data, an account linkage button 51a, an unprocessed receipt button 51b and an unprocessed ToDo button 51c are displayed. When the account linkage button 51a is selected, it is possible to confirm the information on an automatic withdrawal from the user's account at a financial institution which is linked with the management assistance system 1, or the like. When the unprocessed receipt button 51b is selected, it is possible to confirm the image data of receipts received when a commercial product is purchased or the like wherein the image data of the receipt is taken by the portable terminal 2a, 2b and is stored. When unprocessed ToDo button 51c is selected, it is possible to confirm operations which should be processed or must be processed at a predetermined period such as the account settlement of the operation, declaration and payment of salary among operations to be processed by using application programs which is to be executed in the management assistance system 1. When respective confirmation or processing is finished, the account linkage button 51a, the unprocessed receipt button 51b and/or the unprocessed ToDo button 51c are not displayed in the account information display area 51. Since these buttons 51a, 51b and 51c are shown on the comment input screen 5, a user can input the comment information while carrying out confirmation and/or processing of another operation performed by using the management assistance system 1.

In the general comment display area 53, a comment entry field 53a for inputting comment information corresponding to the selected date, an importance entry field 53b for selecting the importance of the comment information input in the comment entry field 53a, a rainy weather entry field 53c for inputting whether it rained or not on the selected date, and an additional information entry field 53d for inputting additional information such as the image data and the POP data, and the like are displayed. The rainy weather entry field 53c is shown as a check box for alleviating a user's burden for an input, and a user can input that it rained on the selected date by checking the rainy weather entry field 53c.

In the comment input screen 5 displayed on the user terminal, a user inputs in the comment entry field 53a an event the user noticed and measures the user carried out in the management on the selected date. Also, the user sets the importance of the comment input in the comment entry field 53a at three levels. The user checks the rainy weather entry field 53c when it rained on the selected date. When there is image data or POP data relating to the comment input in the comment entry field 53a, the user selects the additional information entry field 53d to input the image data or the POP data. FIGS. 6 and 7 show examples of the general comment display area 53 of the comment input screen 5 after each of information is input.

In the input example shown in FIG. 6, the comment information "A person was struck by a train at the nearest station. A new staff member began his work and his education spent time. The operation to increase sales was not possible." is input in the comment entry field 53a. The importance of the comment information is input in the importance entry field 53b at level "3". The rainy weather entry field 53c is checked.

In the input example shown in FIG. 7, the comment information "Created a POP for promotion. Described menus which go with the copies of drinks we want to sell." is input in the comment entry field 53a. The importance of the comment information is input in the importance entry field 53b at level "3". The rainy weather entry field 53c is checked. Furthermore, the additional information entry field 53d is selected and POP data P1 and P2 shown in FIG. 7 are input.

As shown in FIG. 4, the CPU 41 determines whether the comment information and the importance information are respectively input to the comment entry field 53a and the importance entry field 53b (Step S104). If the CPU 41 determines the information is input (Step S104; YES), the CPU 41 makes the storage 45 store the input comment information and importance information (Step S105) and ends the comment input processing. As shown in FIG. 7, when the POP data is input, the POP data is also stored in the storage 45.

On the other hand, if the CPU 41 determines that the comment information and the importance information are not input (Step S104; NO), the CPU 41 determines whether to end the display of the comment input screen 5 (Step S106). For example, the CPU 41 determines whether to end the display of the comment input screen 5 based on whether the user carries out an operation to close the comment input screen 5. If the CPU 41 determines not to end the display of the comment input screen 5 (Step S106; NO), the CPU 41 carries out the processing of Step S104 again. If the CPU 41 determines to end the display of the comment input screen 5 (Step S106; YES), the CPU 41 ends the comment input processing.

The comment input processing is performed as described above.

Figure 8:
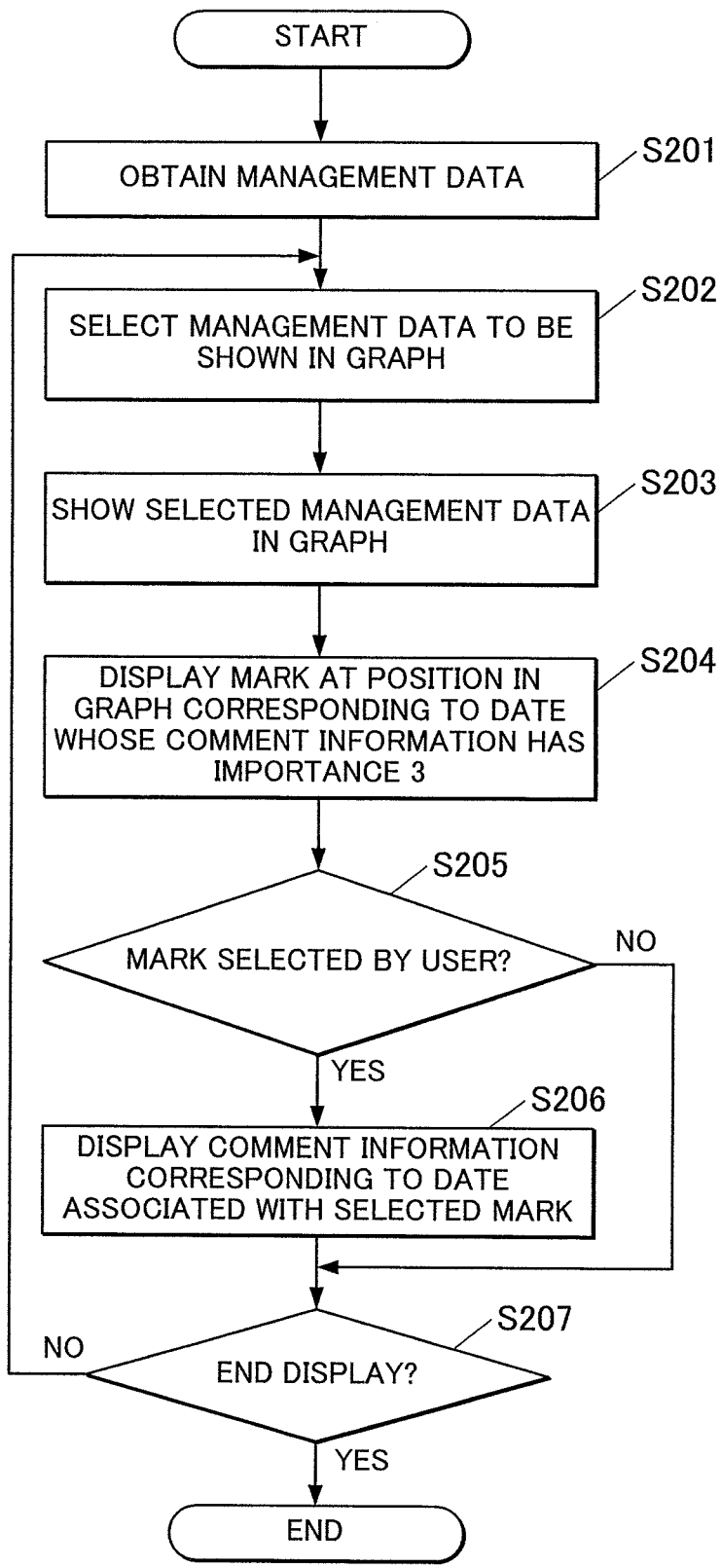
FIG. 8 is a flowchart showing an example of index analysis display processing performed by the server.
Figure 9:
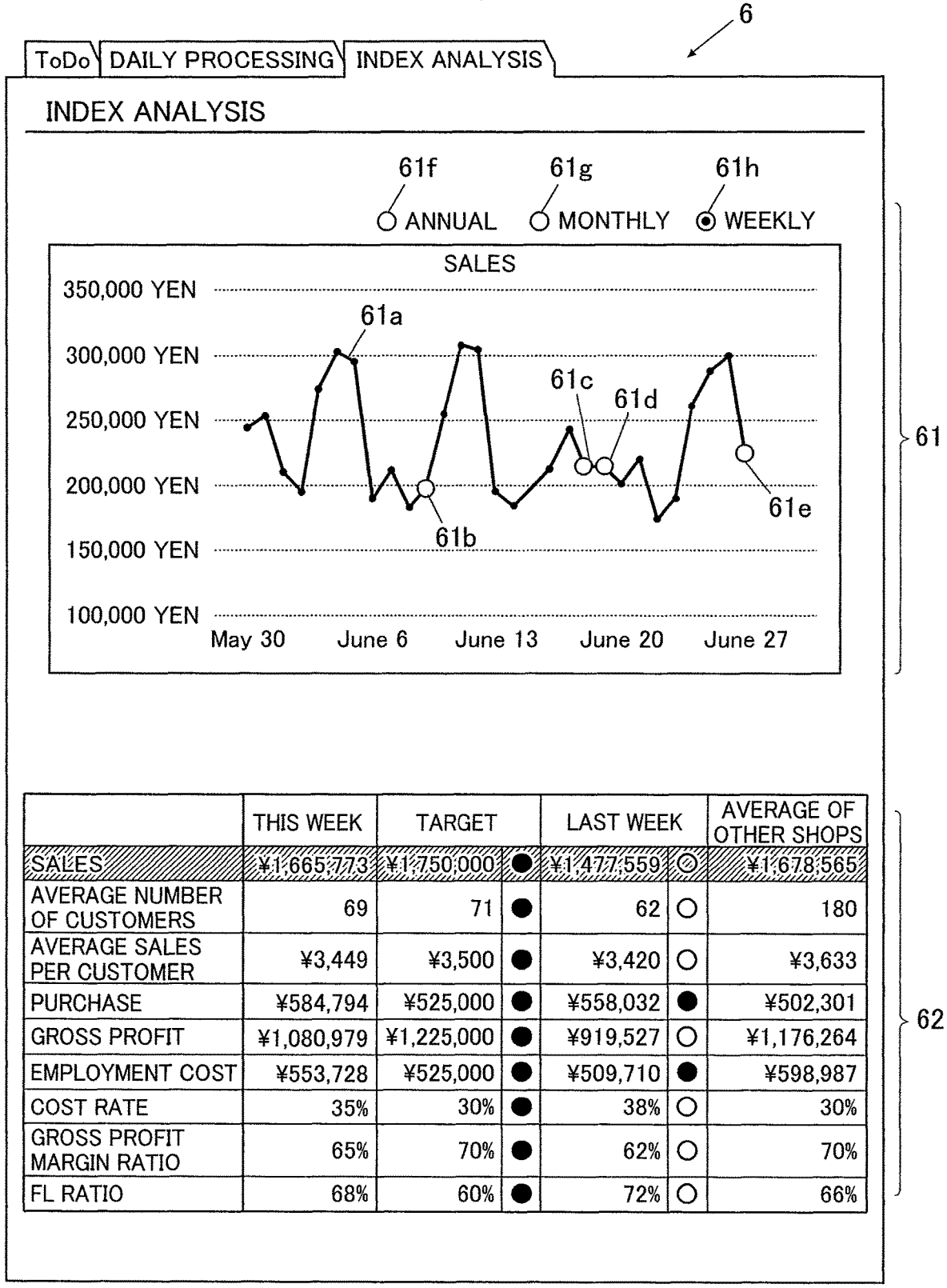
FIG. 9 is a view showing an example of an index analysis screen displayed in the index analysis display processing.
Figure 10:
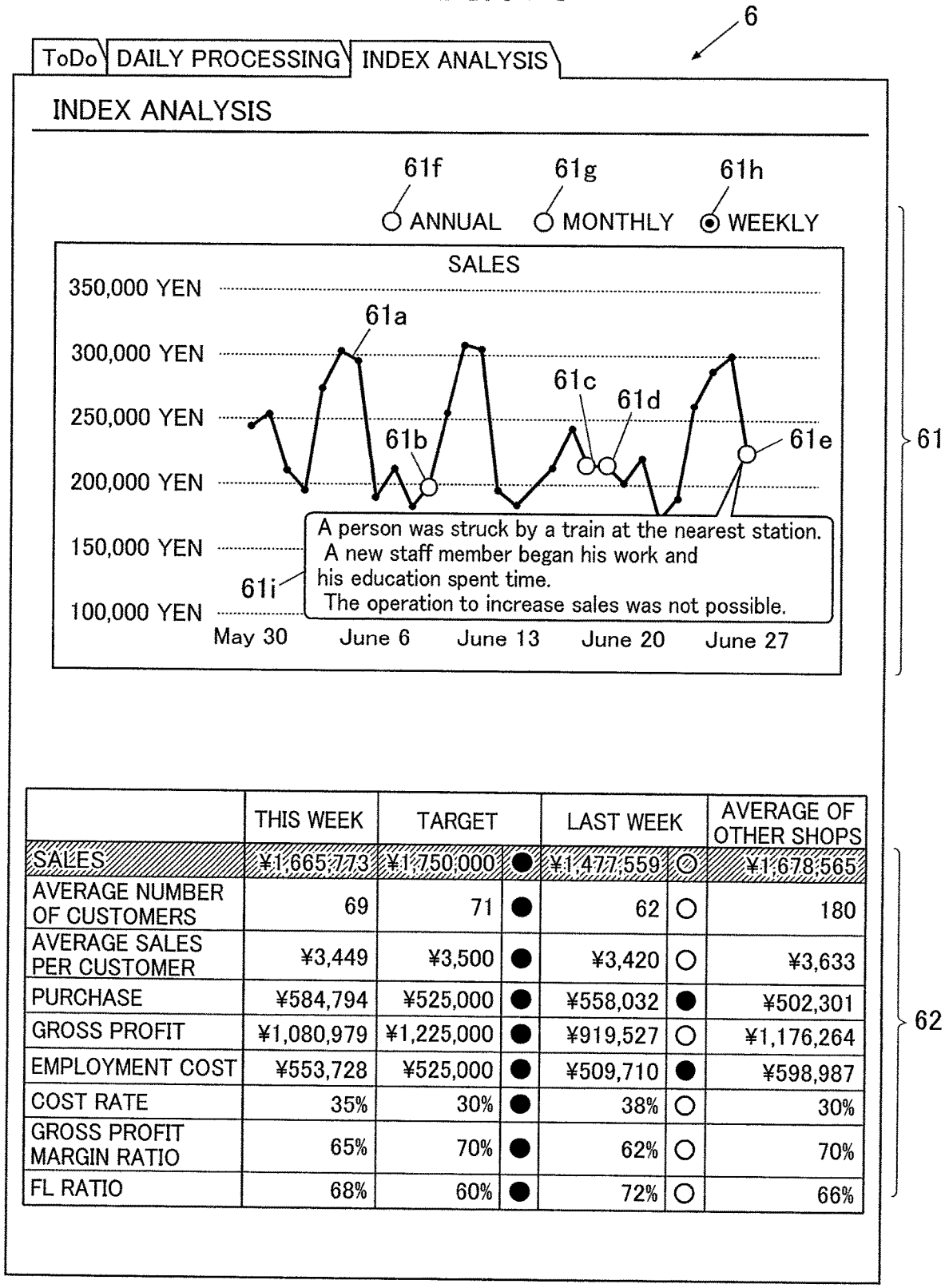
FIG. 10 is a view showing an example of the index analysis screen after a mark is selected by a user.
Figure 11:
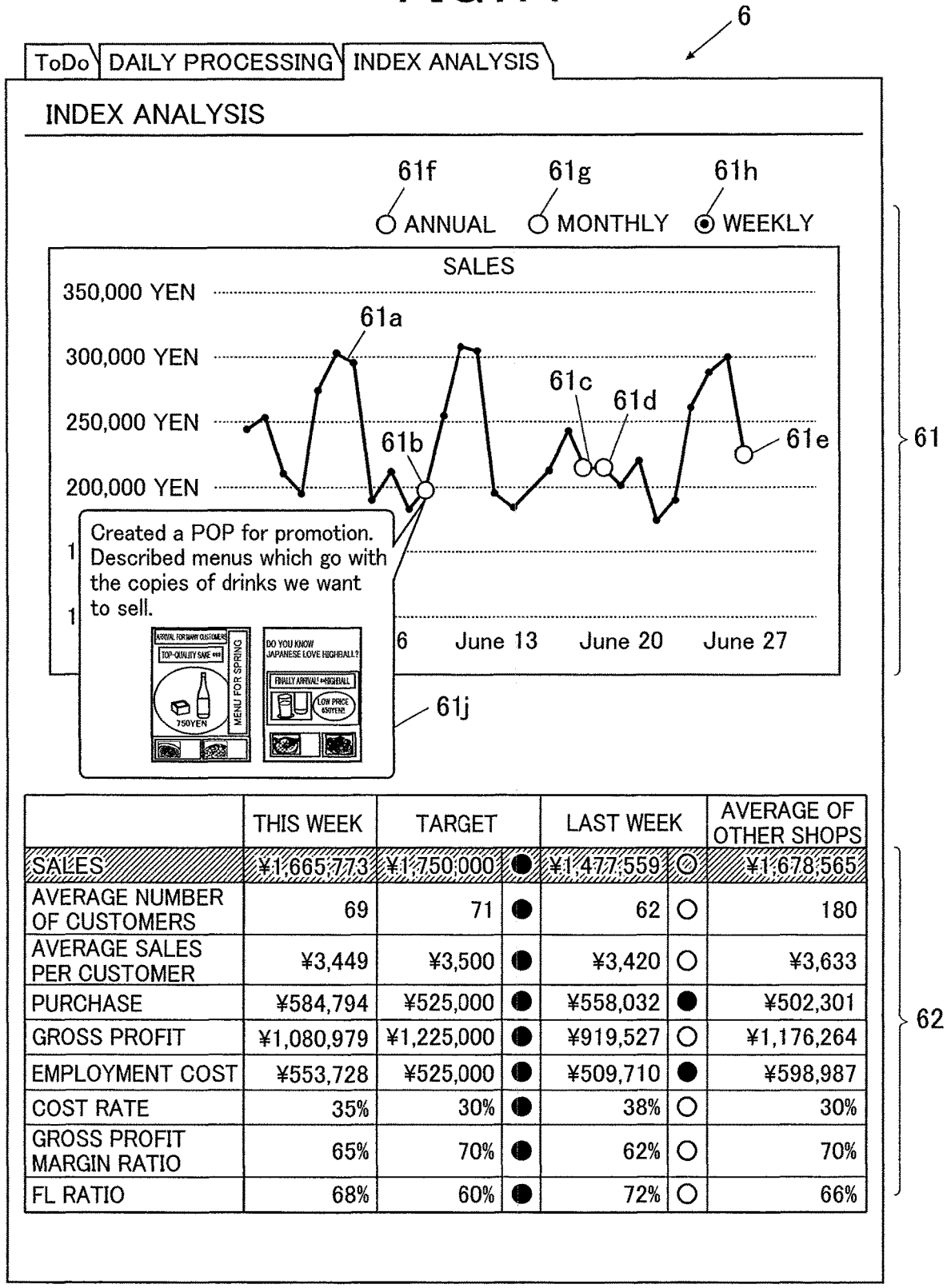
FIG. 11 is a view showing another example of the index analysis screen after a mark is selected by a user.

Next, the index analysis display processing will be described with reference to FIGS. 8 to 11. FIG. 8 is a flowchart showing an example of the index analysis display processing. FIG. 9 shows an index analysis screen 6 shown on the user terminal in the index analysis display processing. FIG. 10 shows an example of the index analysis screen 6 after a mark 61*e* is selected by a user. FIG. 11 shows another example of the index analysis screen 6 after the mark 61*e* is selected by a user.

As shown in FIG. 8, when the communication unit 46 receives from a user terminal an access request to the index analysis screen 6, the CPU 41 of the server 4 obtains from the storage 45 the management data to be shown on the index analysis screen 6 (Step S201).

Next, the CPU 41 of the server 4 selects the management data to be shown in a graph among plural pieces of management data based on the operation information from the user terminal (Step S202). For example, when a user selects "SALES" through the user terminal, the CPU 41 selects "SALES".

The CPU 41 shows the selected management data in a graph (Step S203). The CPU 41 shows a mark at the position (s) in the graph corresponding to the date(s) whose comment information is associated with the importance information which shows the importance of level "3" (Step S204). In this way, the CPU 41 makes the user terminal display the index analysis screen 6 thereon as shown in FIG. 9.

The index analysis screen 6 is constituted by a graph display area 61, a management data display area 62, and the like.

In the graph display area 61, a graph 61*a* which shows, in chronological order, the transition of "SALES" selected in the processing of Step S202 is displayed with the vertical axis indicating "SALES" and the horizontal axis indicating dates. Among the dates indicated on the horizontal axis, the date(s) corresponding to Saturday is shown in blue and the date(s) corresponding to Sunday or public holiday is shown in red. In the example shown in FIG. 9, the graph 61*a* of the management data of the nearest week is displayed. However, when a user selects an annual data button 61*f*, the graph of the nearest annual management data is displayed and when a user selects a monthly data button 61*g*, the graph of the nearest monthly management data is displayed. In that case, when a user selects a weekly data button 61*h*, the graph 61*a* of the nearest weekly management data is displayed again. A user can refer to the graph of the management data in the past by changing the graph displaying period in accordance with the user operation. On the graph 61*a*, circular marks 61*b* to 61*e* are displayed. The marks 61*b* to 61*e* are each displayed on the position corresponding to the date whose comment information is associated with the importance of "3". Thus, in the example shown in FIG. 9, it is possible to understand that the comment information having high importance as to the management exits on "Jun. 9, 2016", "Jun. 18, 2016", "Jun. 19, 2016" and "Jun. 27, 2016".

In this case, the CPU 41 functions as a condition setting unit which sets the condition of the importance information for displaying a mark(s) on the graph. In the example described above, the marks are only displayed on the graph 61*a* for the comment information which satisfies the condition "the importance described by the importance information is equal to or greater than 3". However, the CPU 41 can change this condition to, for example, "the importance described by the importance information is equal to or greater than 2" based on the operation information from the user terminal. In such a case, the marks are each displayed at the position corresponding to the date whose comment information is associated with the importance described by the importance information of "2" or "3".

In the management data display area 62, the specific numerical values of the management data of "LAST WEEK" and "THIS EEK" calculated based on the obtained management data are displayed. Among plural pieces of management data, "SALES" is highlighted wherein "SALES" is the selected management data in Step S202. Also, in the management data display area 62, "TARGET" and "AVERAGE OF OTHER SHOPS" are displayed with the management data of "LAST WEEK" and "THIS WEEK". "TARGET" describes a target value for each management data. A user may set "TARGET" in advance and the CPU 41 may calculate and set "TARGET". "AVERAGE of OTHER SHOPS" shows average value of the management data of the same category of business as the category of business of the user which is registered in advance. In the fields of "TARGET" and "LAST WEEK", "○" or "•" is displayed adjacent to the numerical value of each management data to show the result of a comparison with the management data of "THIS WEEK". That is, "0" indicates that the management data of "THIS WEEK" is excellent in comparison to that of "TARGET" or "LAST WEEK", and "•" indicates that the management data of "THIS WEEK" is inferior to that of "TARGET" or "LAST WEEK".

Next, as shown in FIG. 8, the CPU 41 determines whether a user selects any one of the marks 61*b* to 61*e* on the index analysis screen 6 (Step S205). If the CPU 41 determines that a user does not select the marks 61*b* to 61*e* (Step S205; NO), the CPU 41 skips the processing of next Step S206 and carries out the processing of Step S207 described below.

On the other hand, if the CPU 41 determines that a user selects any one of the marks 61*b* to 61*e* (Step S205; YES), the CPU 41 displays the comment information of the date corresponding to the selected mark 61*b* to 61*e* (Step S206). For example, when a user selects the mark 61*e* on the index analysis screen 6, the CPU 41 displays, in the graph display area 61, a rectangular display area 61*i* which is linked with the mark 61*e*, and the CPU 41 displays, in the display area 61*i*, the comment information corresponding to the date "Jun. 27, 2016" to which the mark 61*e* is attached. In the specific, for example, when the comment information is input as shown in FIG. 6 corresponding to "Jun. 27, 2016", the CPU 41 displays the comment information in the display area 61*i* as shown in FIG. 10. In such a way, a user confirms the graph 61*a* along with the comment information which is previously input and has a high importance. Thus, it becomes easier for the user to consider the reason for the change of the management data and to consider the measures to improve the management based on the reason for the change.

Also, for example, when the user selects the mark 61b on the index analysis screen 6, the CPU 41 displays, in the graph display area 61a, a rectangular display area 61j which is linked with the mark 61b and the CPU 41 displays, in the display area 61j, the comment information corresponding to the date "Jun. 9, 2016" to which the mark 61b is attached. In the specific, for example, when the comment information and POP data is input corresponding to "Jun. 9, 2016" as shown in FIG. 7, the CPU 41 displays, in the display area 61j, the comment information 61j and thumbnail images of the POP data as shown in FIG. 11. Furthermore, when a user selects a thumbnail image of the POP data, the CPU 41 displays the POP data in the original size. Thus, it becomes easier for the user to consider the influence of the POP data on the management data and to consider the measures to improve the management for the future.

As shown in FIG. 8, the CPU 41 determines whether to end displaying the index analysis screen 6 (Step S207). For example, the CPU 41 determines whether to end displaying based on whether a user carries out an operation to close the index analysis screen 6. If the CPU 41 determines not to end displaying the index analysis screen 6 (Step S207; NO), the CPU 41 carries out the processing of Step S202 again. In the specific, the CPU 41 selects the management data to be shown in a graph on the index analysis screen 6 based on a user's operation information. Thus, the user can confirm not only "SALES" shown in the illustrated example but also the graph of other management data to further carry out consideration.

On the other hand, when the CPU determines to end displaying the index analysis screen 6 (Step S207; YES), the CPU 41 ends the index analysis display processing.

The index analysis processing is performed as described above.

Technical Effects of the Present Embodiment

According to the present embodiment, the server 4 includes the storage 45 which stores management data of each of predetermined periods and comment information to be input by a user corresponding to a date; and the CPU 41 which displays on a screen a chronological change of the management data as the graph 61a, wherein the CPU 41 displays the marks 61b to 61e at a position on the graph 61a corresponding to the date, and, when the mark 61b to 61e is selected by a user, displays on a screen the comment information corresponding to the date. Thus, a user can confirm both the graph of management data and the comment information. This makes it easier to consider the cause of the change of the management data and the measures for improvement.

The CPU 41 displays on a screen the management data and a comment entry field 53a for inputting the comment information, and makes the storage 45 store the comment information input in the comment entry field 53a. Thus, a user can input a comment while confirming the management data.

The storage 45 stores importance information which shows an importance of the comment information, and the CPU 41 displays the marks 61b to 61e on the graph 61a only for the date which corresponds to the comment information whose importance information satisfies a condition. Thus, it is possible to display a mark(s) on the graph 61a only for the comment information which satisfies the condition. This makes it possible to suppress displaying too many marks on the graph 61a on a screen and to make the screen easy viewable.

The CPU 41 functions as a condition setting unit which sets a condition of the importance information for the mark to be displayed on the graph 61a. Thus, by changing the setting of the condition, the number of the marks displayed on the graph 61a can be increased or decreased. This makes it possible to display a mark (s) on the graph 61a in accordance with a user's preference and to make the screen easy viewable.

The storage 45 stores image data or POP data to be added to the comment information and, when the mark is selected by a user, the CPU 41 displays on a screen the image data or the POP data with the comment information corresponding to the date. Thus, it is possible to confirm the image data or the POP data in addition to the graph of the management data and the comment information. This makes it easy to consider the cause of the change of the management data and the measures for improvement.

Other

The description on the embodiment described above is an example of a preferable management assistance device according to the present invention, but this is not limitative.

For example, in the embodiment described above, the management data and the comment information are input to the server 4 through the user terminal, and the server 4 makes the user terminal display various screens, but this is not limitative. For example, the management data and the comment information may be directly input to the server 4 by the operation input unit 42 of the server 4 and the server 4 may display various screens on the display 44. Also, PC used by a user, or the like may be configured similarly so as to function as a management assistance device.

In the embodiment described above, the importance information shows the importance ranked at three levels in accordance with a user's choice, but this is not limitative. For example, the importance information may be ranked at two levels (important or unimportant) or may be ranked at four ranks or more. The server 4 may be configured such that the setting of the importance shown by the importance information is changeable between importance ranked at two levels and importance ranked at four levels or more in accordance with a user's operation.

In the embodiment described above, the additional information which is input and displayed with the comment information includes at least one of image data and POP data, but this is not limitative. The additional information may include, for example, document data and graphic data.

In the embodiment described above, the rainy weather entry field 53c is displayed in the general comment display area 53 on the comment input screen 5, but the rainy weather entry field 53c may not be displayed. A weather entry field for inputting weather may be displayed instead of the rainy weather entry field 53c. Also, in the graph display area 61 on the index analysis screen 6, when the rainy weather entry field 53c of a predetermined date is checked, the color and/or pattern of the background corresponding to the predetermined date may be changed. In this case, a user who confirms the graph 61a on the index analysis screen 6 can also confirm the weather. Thus, it is possible to make the consideration on the management easier.

In the embodiment described above, the marks 61b to 61e which are displayed on the graph 61a on the index analysis screen 6 are circular, but the marks 61b to 61e may have any shape, any color and any size. Also, for example, in case where the marks are displayed for the plural pieces of comment information whose importance are different from each other, the shape, color, size or the like of the marks may be different in accordance with the importance.

In the embodiment described above, the management data display area 62 is displayed on the index analysis screen 6. However, the index analysis screen 6 may not display the management data display area 62. Also, in the management data display area 62, fields for "THIS WEEK", "TARGET", "LAST WEEK" and "AVERAGE OF OTHER SHOPS" are displayed, but this is not limitative. For example, instead of these or in addition to these, the fields for "THE WEEK BEFORE LAST", "THIS MONTH", "LAST MONTH", "TODAY", "YESTERDAY", "THIS YEAR" or "LAST YEAR" may be displayed or only any of them may be displayed. Also, in the management data display area 62, the management data of "SALES", "AVERAGE NUMBER OF CUSTOMERS", "AVERAGE SALES PER CUSTOMER", "PURCHASE", "GROSS PROFIT", "EMPLOYMENT COST", "COST RATE", "GROSS PROFIT MARGIN RATIO" and "FL RATIO" are displayed, but this is not limitative. For example, management data other than them may be displayed or only any of them may be displayed.

In the embodiment described above, when the marks 61*b* to 61*e* on the index analysis screen 6 are selected by a user, the input comment information is displayed. However, in accordance with a user's operation, the comment information input in the past may be displayed on a screen separate from the index analysis screen 6.

In the embodiment described above, an example is disclosed in which a hard disk, semiconductor nonvolatile memory or the like is used as a computer-readable medium storing a program thereon according to the present invention, but this example is not limitative. A portable recording medium such as a CD-ROM may be applied as another computer-readable recoding medium. Also, a carrier wave may be applied as a medium which provide the data of the program according to the present invention through a communication line.

Embodiments of the present invention have been described, but the scope of the present invention is not limited to the embodiments described above, but includes the scope of the invention described in claims and equivalents thereof.

The invention claimed is:

1. A management assistance device comprising:
a storage; and
a processing unit,
wherein the storage stores:
    management data of each of predetermined periods; and
    registered information including at least:
        comment information which is input by a user and which is associated with each of date information; and
        importance information that shows importance of the comment information,
wherein the processing unit executes:
    a condition setting process to set a predetermined condition based on a user operation;
    a determining process to determine whether the importance information corresponding to the comment information associated with each of the date information satisfies the predetermined condition; and
    a first display controlling process to generate and display, on a screen, a graph with a predetermined mark for each of the date information, the graph showing a chronological change of the management data, and wherein the first display controlling process comprises:
    displaying, on the screen, a specific mark on the graph for a first date information for which the importance information is determined to satisfy the predetermined condition in the determining process, the specific mark having an appearance different from a mark for a second date information for which the importance information is not determined to satisfy the predetermined condition, the specific mark being displayed as an operation button for switching display on the screen; and
    when the user selects the specific mark for the first date information displayed as the operation button, displaying, on the screen, the comment information associated with the first date information by switching the display on the screen.

2. The management assistance device according to claim 1, wherein the processing unit further executes, in response to a request from the user, a second display controlling process to display on the screen a comment display area for inputting the comment information with a check box which is for inputting whether it rained or not and which is associated with the date information.

3. The management assistance device according to claim 2, wherein:
    the processing unit further executes a receiving process to receive weather information which is associated with the date information and which is input by the user in the comment display area displayed on the screen in the second display controlling process; and
    in the first display controlling process, an area for the date information on the graph which is associated with the received weather information is displayed in a state distinguishable from an area associated with other date information.

4. The management assistance device according to claim 3, wherein:
    the receiving process further includes receiving image data associated with the comment information for each of the date information; and
    the first display controlling process further includes displaying the image data in line with the comment information when the user selects the specific mark.

5. The management assistance device according to claim 4, wherein the image data is POP (Point of Purchase) data, which is data for creating point of purchase advertising media for promotion.

6. A management assistance method of making a computer of a management assistance device perform steps,
wherein the computer comprises a storage that stores:
    management data of each of predetermined periods; and
    registered information including at least:
        comment information which is input by a user and which is associated with each of date information; and
        importance information that shows importance of the comment information,
wherein the steps comprise:
    a condition setting step to set a predetermined condition based on a user operation;
    a determining step to determine whether the importance information corresponding to the comment information associated with each of the date information satisfies the predetermined condition; and
    a first display controlling step to generate and display, on a screen, a graph with a predetermined mark for each of the date information, the graph showing a chronological change of the management data, and
wherein the first display controlling step comprises:
displaying, on the screen, a specific mark on the graph for a first date information for which the importance information is determined to satisfy the predetermined condition in the determining step, the specific mark having an appearance different from a mark for a second date information for which the importance information is not determined to satisfy the predetermined condition, the specific mark being displayed as an operation button for switching display on the screen; and
when the user selects the specific mark for the first date information displayed as the operation button, displaying, on the screen, the comment information associated with the first date information by switching the display on the screen.

7. The management assistance method according to claim 6, wherein the steps further comprise, in response to a request from the user, a second display controlling step to display on the screen a comment display area for inputting the comment information with a check box which is for inputting whether it rained or not and which is associated with the date information.

8. The management assistance method according to claim 7, wherein:
the steps further comprise a receiving step to receive weather information which is associated with the date information and which is input by the user in the comment display area displayed on the screen in the second display controlling step; and
in the first display controlling step, an area for the date information on the graph which is associated with the received weather information is displayed in a state distinguishable from an area associated with other date information.

9. The management assistance method according to claim 8, wherein:
the receiving step further includes receiving image data associated with the comment information for each of the date information; and
the first display controlling step further includes displaying the image data in line with the comment information when the user selects the specific mark.

10. The management assistance method according to claim 9, wherein the image data is POP (Point of Purchase) data, which is data for creating point of purchase advertising media for promotion.

11. A non-transitory computer-readable recording medium storing a program that makes a processing unit of a management assistance device execute processes,
wherein the recording medium stores:
management data of each of predetermined periods; and
registered information including at least:
comment information which is input by a user and which is associated with each of date information; and
importance information that shows importance of the comment information,
wherein the processes comprise:
a condition setting process to set a predetermined condition based on a user operation;
a determining process to determine whether the importance information corresponding to the comment information associated with each of the date information satisfies the predetermined condition; and
a first display controlling process to generate and display, on a screen, a graph with a predetermined mark for each of the date information, the graph showing a chronological change of the management data, and
wherein the first display controlling process comprises:
displaying, on the screen, a specific mark on the graph for a first date information for which the importance information is determined to satisfy the predetermined condition in the determining process, the specific mark having an appearance different from a mark for a second date information for which the importance information is not determined to satisfy the predetermined condition, the specific mark being displayed as an operation button for switching display on the screen; and
when the user selects the specific mark for the first date information displayed as the operation button, displaying, on the screen, the comment information associated with the first date information by switching the display on the screen.

12. The non-transitory computer-readable recording medium according to claim 11, wherein the processes further comprise, in response to a request from the user, a second display controlling process to display on the screen a comment display area for inputting the comment information with a check box which is for inputting whether it rained or not and which is associated with the date information.

13. The non-transitory computer-readable recording medium according to claim 12, wherein:
the processes further comprise a receiving process to receive weather information which is associated with the date information and which is input by the user in the comment display area displayed on the screen in the second display controlling process; and
in the first display controlling process, an area for the date information on the graph which is associated with the received weather information is displayed in a state distinguishable from an area associated with other date information.

14. The non-transitory computer-readable recording medium according to claim 13, wherein:
the receiving process further includes receiving image data associated with the comment information for each of the date information; and
the first display controlling process further includes displaying the image data in line with the comment information when the user selects the specific mark.

15. The non-transitory computer-readable recording medium according to claim 14, wherein the image data is POP (Point of Purchase) data, which is data for creating point of purchase advertising media for promotion.

* * * * *